United States Patent [19]
Chang et al.

[11] Patent Number: 6,035,324
[45] Date of Patent: Mar. 7, 2000

[54] CLIENT-SIDE ASYNCHRONOUS FORM MANAGEMENT

[75] Inventors: Hung-yang Chang, Yorktown Heights; Norman H. Cohen, Spring Valley, both of N.Y.; Richard Allen Floyd; Barron Cornelius Housel, III, both of Chapel Hill, N.C.; David Bruce Lindquist, Raleigh, N.C.; Steve Mastrianni, Unionville, Conn.; Marshall Shapiro; Carl D. Tait, both of New York, N.Y.

[73] Assignee: International Business Machines Corporation, Armonk, N.Y.

[21] Appl. No.: 08/920,252

[22] Filed: Aug. 28, 1997

[51] Int. Cl.⁷ .................................................. G06F 13/00
[52] U.S. Cl. .......................................................... 709/203
[58] Field of Search ........................ 709/200, 201, 709/203, 217, 218, 219, 227

[56] References Cited

U.S. PATENT DOCUMENTS

| | | | |
|---|---|---|---|
| 4,438,511 | 3/1984 | Baran | 370/19 |
| 4,893,307 | 1/1990 | McKay et al. | 370/94.1 |
| 5,021,949 | 6/1991 | Morton et al. | 364/200 |
| 5,193,162 | 3/1993 | Bordsen et al. | 395/200.08 |
| 5,220,501 | 6/1993 | Lawlor et al. | 364/408 |
| 5,241,625 | 8/1993 | Epard et al. | 395/163 |
| 5,321,542 | 6/1994 | Freitas et al. | 359/172 |
| 5,412,654 | 5/1995 | Perkins | 370/94.1 |
| 5,442,633 | 8/1995 | Perkins et al. | 370/94.1 |
| 5,446,736 | 8/1995 | Gleeson et al. | 370/473 |
| 5,448,561 | 9/1995 | Kaiser et al. | 370/85.1 |
| 5,473,772 | 12/1995 | Halliwell et al. | 395/650 |
| 5,481,721 | 1/1996 | Serlet et al. | 395/700 |
| 5,511,208 | 4/1996 | Boyles et al. | 395/800 |
| 5,572,528 | 11/1996 | Shuen | 370/402 |
| 5,572,643 | 11/1996 | Judson | 395/793 |
| 5,574,906 | 11/1996 | Morris | 395/601 |
| 5,581,558 | 12/1996 | Horney, II et al. | 370/401 |
| 5,600,834 | 2/1997 | Howard | 395/617 |
| 5,611,038 | 3/1997 | Shaw et al. | 395/806 |
| 5,673,322 | 9/1997 | Pepe et al. | 380/49 |

(List continued on next page.)

FOREIGN PATENT DOCUMENTS

| | | | |
|---|---|---|---|
| 0 524 123 A2 | 1/1993 | European Pat. Off. | G06F 15/16 |
| 0 665 670 A3 | 1/1995 | European Pat. Off. | H04L 29/06 |
| WO97/15020 | 4/1997 | WIPO | G06F 19/00 |
| WO97/30403 | 8/1997 | WIPO | G06F 17/30 |
| WO97/30538 | 8/1997 | WIPO | H04L 29/06 |
| WO97/30539 | 8/1997 | WIPO | H04L 29/06 |

OTHER PUBLICATIONS

IBM ARTour Web Express Server Guide, First Edition (Feb. 1997).

IBM ARTour Web Express Server Guide, Second Edition (Jun. 1997).

IBM Technical Disclosure Bulletin, Method to Reduce Changed Data Sent Between Computer Systems, vol. 35, No. 1B, pp. 110–112.

Austin, et al., File System Caching in Large Point–to–Point Networks, *Software Engineering Journal*, vol. 7, No. 1, pp. 65–80 (Jan. 1992).

(List continued on next page.)

*Primary Examiner*—Moustafa M. Meky
*Attorney, Agent, or Firm*—Myers Bigel Sibley & Sajovec; Jeanine S. Ray-Yarletts

[57] ABSTRACT

Methods, systems and computer program products are provided for communicating with a web browser executing on a remote/mobile processing system which is temporarily and intermittently connected to a second computer. According to the present invention, requests from the web browser to a server application accessible to the second computer are stored in a persistent request queue at the remote/mobile processing system. An interim response is provided to the web browser in response to the request from the client application. The stored request may be recalled to allow user modification of the stored request prior to the request being provided to the second computer for transmission to the server application.

39 Claims, 5 Drawing Sheets

U.S. PATENT DOCUMENTS

| | | |
|---|---|---|
| 5,701,451 | 12/1997 | Rogers et al. .......................... 709/200 |
| 5,737,536 | 4/1998 | Herrmann et al. .................. 395/200.59 |
| 5,751,963 | 5/1998 | Umetsu ............................... 395/200.53 |
| 5,754,774 | 5/1998 | Bittinger et al. .................... 395/200.33 |
| 5,764,910 | 6/1998 | Shachar .............................. 395/200.53 |
| 5,774,660 | 6/1998 | Brendel et al. ..................... 395/200.31 |
| 5,829,023 | 10/1998 | Bishop .................................... 711/211 |
| 5,850,517 | 12/1998 | Verkler et al. ........................... 709/202 |
| 5,857,201 | 1/1999 | Wright, Jr. et al. ..................... 707/104 |
| 5,859,971 | 1/1999 | Bittinger et al. .................... 395/200.33 |
| 5,867,661 | 2/1999 | Bittinger et al. .................... 395/200.57 |
| 5,870,558 | 2/1999 | Branton, Jr. et al. ................... 709/203 |
| 5,878,213 | 3/1999 | Bittenger et al. ................... 395/200.33 |
| 5,928,323 | 7/1999 | Gosling et al. .......................... 709/203 |

OTHER PUBLICATIONS

Nelson, et al., Caching in the Sprite Network File System, *Operating Systems Review*, vol. 21, No. 5, pp. 3–4 (1987).

Huizinga, et al., Two–Level Client Caching and Disconnected Operation of Notebook Computers in Distributed Systems, *SIGICE Bulletin*, vol. 21, No. 1, pp. 9–14 (Jul. 1995).

Abstract, IBM Technical Disclosure Bulletin, Method for Transmitting Only Document Change Data, vol. 27, pp. 844–846 (Jun. 1984).

International Search Report for International Application No. PCT/US96/11555.

Hypertext Transfer Protocol—HTTP/1.1, HTTP Working Group, Berners–Lee, et al. –Internet—Draft (Jan. 19, 1996).

Hypertext Transfer Protocol—HTTP/1.0, HTTP Working Group, Berners–Lee, et al. –Internet—Draft (Feb. 19, 1996).

Basic HTTP; W3Ologo HTTP circa May. 3, 1994.

Basic HTTP as defined in 1992; W3Ologo HTTP circa Oct. 7, 1997.

ARTour, IBM Sales Brochure G325–3598–0 printed Sep. 1995.

ARTour, IBM Sales Brochure G325–3595–00, printed Sep. 1995.

IBM ARTour Technical Overview—Release 1; IBM Publication SB14–0110–00 (1995).

Bird, R., Advances in APPN architecture, *IBM Systems Journal*, vol. 34, No. 3, pp. 430–451 (1995).

IBM ARTour Web Express Server Guide, First Edition (Feb. 1997).

IBM ARTour Web Express Server Guide, Second Edition (Jun. 1997).

Berners–Lee, T., et al., The World–Wide Web, *Communications of the Association for Computing Machinery*, vol. 37, No. 8, pp. 76–82 (Aug. 1994).

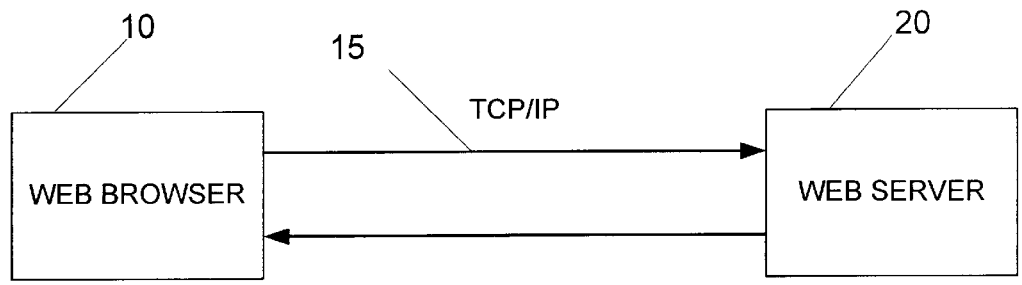
FIGURE 1 - PRIOR ART
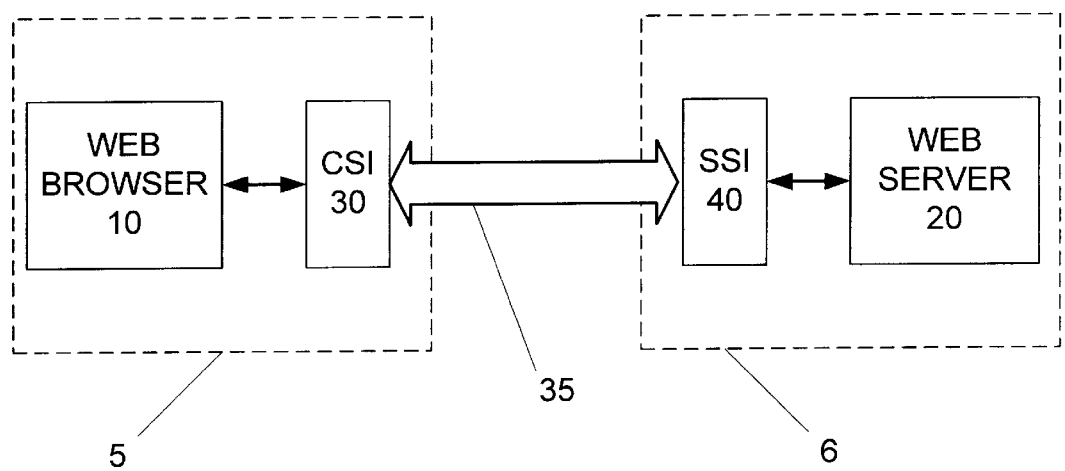
FIGURE 2

CLIENT-SIDE ASYNCHRONOUS FORM MANAGEMENT

FIELD OF THE INVENTION

The present invention relates remote/mobile computing, and more particularly to remote/mobile computing using the web browser/web server communication model.

BACKGROUND OF THE INVENTION

The recent publicity and emphasis on the "information superhighway" has increased awareness and acceptance of the Internet as a mass communication media. This broad based recognition of the Internet as a viable media for communication and interaction across multiple networks has also created a large established user base built upon the Internet standardized protocols for interaction between computer networks.

The paradigm for the Internet is that of a client-server relationship where Internet clients (browsers) communicate with Internet servers. To provide greater access to the Internet the communication protocols and languages utilized by the clients and servers have become standardized. These protocols include the Hyper-Text Transfer Protocol (HTTP), which is the communication protocol used for communications between clients and servers, and the Transfer Control Protocol/Internet Protocol (TCP/IP) the TCP portion of which is the transport specific protocol for communication between computers or applications. Also standardized is the language in which clients and servers communicate which is called Hyper-Text Markup Language (HTML).

In the context of the World Wide Web client/server applications the client may be a web browser which acts as the user interface. The web browser sends user requests to the appropriate web server and formats and displays the HTML data returned from the web server. The web browser also evaluates the HTML data to determine if there are any embedded hyper-link statements in the HTML data which would require subsequent browser requests which would then be initiated by the browser. A web server acts as the server for the client and processes the web browsers requests and returns the requested response as an HTML data portion of a HTTP data stream.

The basic communication structure for an Internet based system is depicted in FIG. 1. In FIG. 1 a web browser 10 communicates with a web server 20 over a communication link 15. This communication link is typically a local area network connection, wide area network connection, a connection over telephone lines or a combination thereof. The web browser 10 communicates with the web server 20 using TCP/IP. For the majority of Internet communications a web browser communicates with a web server using the generic communication protocol HTTP which is transmitted between the web browser and the web server over the TCP/IP link between the web browser and the web server. The actual data transferred between the web browser 10 and the web server 20 are HTTP data objects (e.g. HTML data) as described above. The web server 20 may be a proxy which receives web browser communications from a number of web browsers and routes them to the appropriate server.

The popularity of the web browser/web server and their common information and transport protocols, HTML and HTTP, has lead to rapid acceptance of web technology as a universal interface for network access to information. Furthermore, because the protocols and language for communication between web browsers and web servers are standardized the communication protocols and language will be the same whether a user is using Netscape Navigator™, NCSA Mosaic™, WebExplorer™ or any other web browser as their web browser to access network information. Therefore, the large installed user base for web browsers combined with the connectivity of the Internet and the ease of writing web application servers using the HTTP defined Common Gateway Interface (CGI)make web technology very attractive for a large class of forms-based applications.

At the same time that the Internet was growing in popularity and acceptance, mobile computing was also increasing in popularity. The use of laptops, notebooks, Personal Digital/Communication Assistants (PDAs/PCAs) and other portable devices has lead to an increase in demands for wireless communications. Wireless wide area networks, cellular communications and packet radio, however, suffer from common limitations if used in a web context. The high cost per byte of communications, slow response time, low bandwidth and unreliability all hamper use of wireless technology for the stateless communication protocol of the World Wide Web. Also, because the web protocol is stateless the amount of data per request and the number of communication requests transferred over the wireless connection are larger than would be necessary if the communication were not self contained.

Furthermore, the underlying mechanisms and protocols of Web browsing were developed with a traditional network model in mind. These mechanisms were developed based on the tacit assumption that the computers involved were connected via high-bandwidth, inexpensive, reliable links. However, in contrast to a wired LAN or WAN environment, mobile links are typically low-bandwidth, costly, and unreliable. Some mobile connections are less burdensome than others—for example, a simple dialup modem is both faster and cheaper than packet radio—but all are dramatically slower than their LAN counterparts. Mobile connections are also less reliable: dropped connections are not uncommon due to signal degradation, blockage, and other problems. Thus, applications such as web browsers that were targeted for a LAN environment often perform very poorly in a network-constrained setting.

Furthermore, the mobile environment raises the issue of disconnected operation. Standard Web browsing—as well as many existing networked applications—assume that disconnection is a comparatively rare error case. Operations typically fail when the client is disconnected from the server.

Weak connectivity and the possibility of disconnection lead to yet a third aspect of the mobility problem: the dynamic nature of a user's connectivity. At different times, a single user may be strongly connected (LAN), weakly connected (cellular or other mobile link) or disconnected.

Several factors contribute to poor usability and reduced user productivity when using browsers in a resource-constrained or unreliable communication environment typified by wireless communication. First, the browser protocol is synchronous, which means that users must wait until a request completes before another request can be made. When the delay is long due to slow wireless transmission, congested Internet or intranet traffic, or overburdened Web servers, users may become frustrated and unproductive.

Second, the natural burstiness of the synchronous request/response scheme may become a significant problem over a slow link. Over a wired LAN, server response time is usually the primary concern, but in a wireless environment, bandwidth and latency are typically the dominating factors.

(Latency on a packet radio network can be on the order of several seconds.) Third, the usual synchronous request/response model does not work at all in the face of voluntary or involuntary disconnection. If a request cannot be satisfied immediately, an error code is typically returned and the user must explicitly retry the request at a later time.

In light of the above discussion, a need exists for improvements in the web browser/web server operation in the mobile computing environment which may be characterized by varying levels of connection performance and reliability.

SUMMARY OF THE INVENTION

In view of the above discussion, it is an object of the present invention to reduce the impact of the synchronous nature of browser communication in a weakly connected or disconnected environment.

A further object of the present invention is to overcome browser limitations in a remote or mobile environment where transmission time, latency or other communication limitations reduce responsiveness of browser/server communications.

Still another object of the present invention is to provide browser functions in a mobile environment where the nature of the environment is transparent to a user.

Still another object of the present invention is to make connection status transparent to browsers such that existing browsers may be utilized in a mobile environment.

These and other objects of the present invention are provided by methods, systems and computer program products for communicating with a web browser executing on a remote/mobile processing system which is temporarily and intermittently connected to a second computer. According to the present invention, requests from the web browser to a server application accessible to the second computer are stored in a persistent request queue at the remote/mobile processing system. An interim response is provided to the web browser in response to the request from the client application. The stored request may be recalled to allow user modification of the stored request prior to the request being provided to the second computer for transmission to the server application.

Furthermore, the stored request can be transmitted to the second computer when the remote/mobile data processing system is connected to the second computer and a response to the request from the server received through the second computer. The response to the request may be stored at the remote/mobile processing system associated with the stored request. The stored response may also be provided to the client application.

By storing requests in a request queue and providing an interim response to the web browser, asynchronous operation of the web browser may be achieved. Furthermore, by storing the requests until a connection is established, the requests may be recalled and edited to allow a user to change the request before it is processed. Thus, the present invention overcomes the limitations of weak connectivity. Furthermore, in slow speed environments, the present invention allows a user to continue to work while communications are performed in the background.

In a particular embodiment of the present invention, a list of stored requests is provided to the web browser for presentation to a user. User input is accepted to select one of the stored requests in the list of stored requests and the associated response to a selected one of the list of stored requests is provided to the web browser based upon the user input.

In a further embodiment, the user is notified of the availability of the received response when the response is received by the remote/mobile data processing system and the response provided to the web browser if the user requests the response.

In stall a further embodiment of the present invention, an HTML form associated with the request and the user input associated with the request are stored. The stored user input is associated with the stored HTML form. Thus, by storing the original form that created the request and the user input of the request the request may be recalled by the user for modification or verification. Such a recall may be accomplished by providing a list of stored requests to the web browser for presentation to a user and accepting user input to select one of the stored requests in the list of stored requests. The stored request selected by the user input may then be provide to the user in the original form that the request was generated.

The original form of the request may be generated by recalling the stored form associated with the request and the stored user input associated with the request. The recalled form and the recalled user input may then be provided to the web browser so as to recreate the form with the user input. The recalled form and user input may be combined by scanning the recalled form for named fields in the recalled form and scanning the recalled user input for name/value pairs in the user input. The default selection or user input of the named field in the recalled form may then be replaced with the value of a matching name/value pair from the user input.

In yet another embodiment of the present invention, it is determined if a response to the recalled stored request has been stored at the remote/mobile data processing system. A link to the stored response to the recalled form may then be provided so as to provide to the user a hyperlink to recall the stored response.

Furthermore, user input may be accepted to revise an original request from the web browser so as to provide a revised request based upon the original request modified by the user input. The revised request may then be stored in the request queue. The request in the request queue may optionally be replaced with the revised request.

In still another embodiment of the present invention it is determined if the remote/mobile data processing system is linked to the second computer. In such an embodiment, the requests are only stored if the remote/mobile data processing system is not linked to the second computer.

As will further be appreciated by those of skill in the art, the present invention may be embodied as a method, apparatus/system or computer program product.

BRIEF DESCRIPTION OF THE DRAWINGS

FIG. 1 is a block diagram of a typical web browser/web server system;

FIG. 2 is a block diagram of a web browser/web server system according to one embodiment of the present invention utilizing a client intercept and a server intercept;

DETAILED DESCRIPTION OF THE INVENTION

Figure 3:
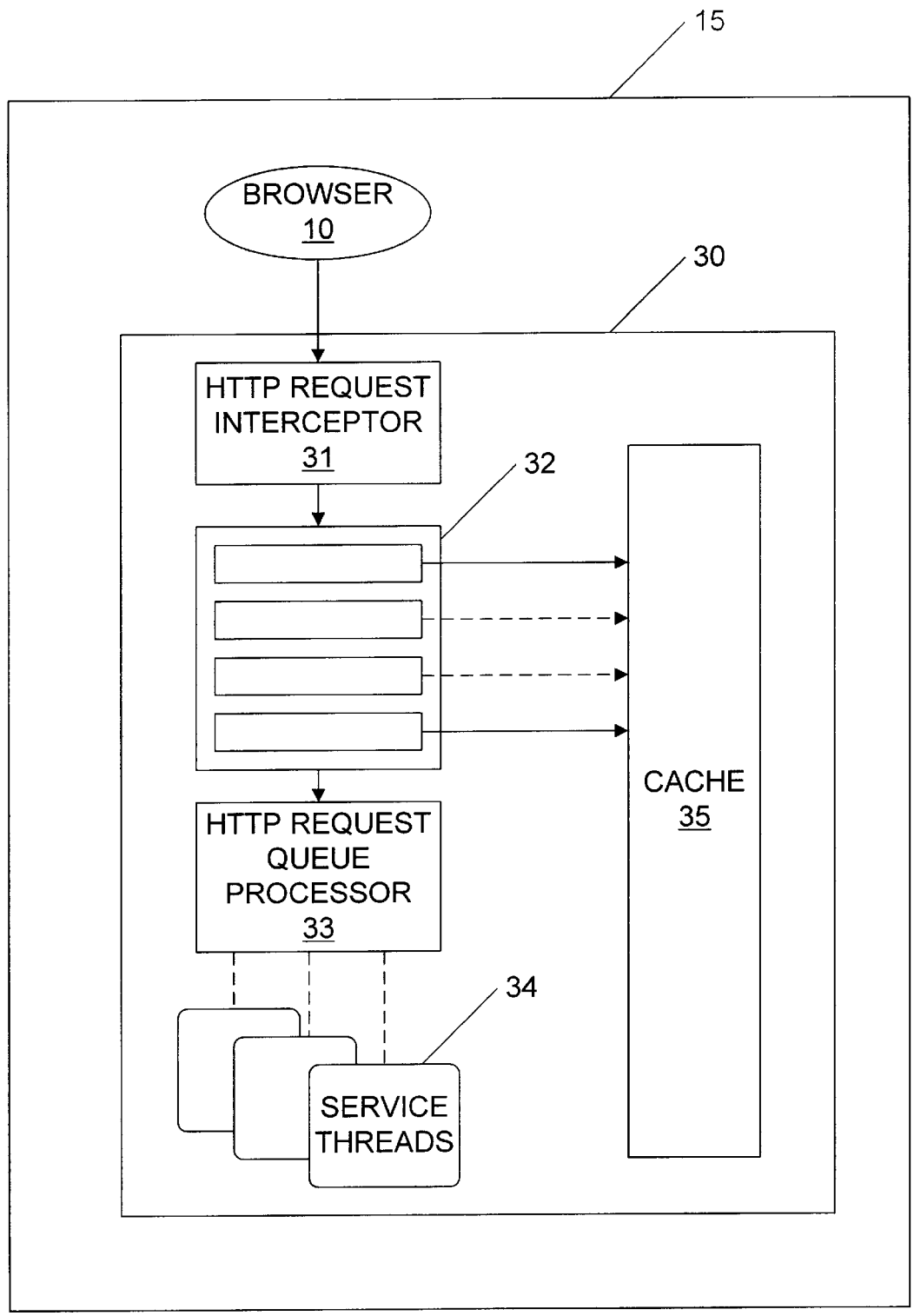
FIG. 3 is a block diagram of a remote/mobile data processing system according to the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

FIG. 2 illustrates one embodiment of the present invention. As seen in FIG. 2, a web browser 10 communicates with a client-side intercept module 30. The web server 20 communicates with a server-side intercept module 40. The client-side intercept module 30 then communicates with the server-side intercept module 40 over the communication link 35. The web browser 10 and the client-side intercept module 30 may be contained in a first computer 5. The server-side intercept module 40 and the web server 20 may be contained in a second computer 6. The first computer 5 and the second computer 6 communicate over external communication link 35. The first computer 5 is preferably a remote/mobile data processing system. As used herein, "remote/mobile" means "temporarily and intermittently linked", wherein temporarily means "lasting for a limited time" and intermittently means "coming and going at intervals, not continuous, or occasional." Remote/Mobile data processing systems may also include data processing systems which remotely access other systems such as over a network.

Preferably, the web browser 10 is a Internet web browser utilizing hypertext transfer protocol (HTTP) and hypertext markup language (HTML) to communicate with an Internet web server 20 which also uses HTTP and HTML. In operation, the web browser 10 would output an HTTP data stream which is intercepted by the client-side intercept module 30. The intercept of the HTTP data stream by the client-side intercept module 30 may be accomplished through the use of the TCP/IP loop-back feature where the client side intercept module 30 resides at an IP address having a network number of 127, such as 127.0.0.1. The client-side intercept module 30 then converts or transforms the HTTP data stream into a client/server specific protocol and transmits the client/server specific data stream onto the external communication link 35. The server-side intercept module 40 receives the client/server specific data stream and reconstructs the original HTTP data stream corresponding to the web browser originated communication. This reconstructed HTTP data stream is then transferred to the web server 20. The web server 20 responds to the HTTP data stream in the normal manner of an Internet web server. As will be appreciated by one of skill in the art, the web server 20 may also be a proxy which allows multiple browsers to connect to the Internet.

When information is received by the web server 20 for transmission to the web browser 10, for example, in response to a browser request for a specific URL home page, the web server 20 outputs an HTTP data stream corresponding to the communication to be sent to the web browser 10. This web server originated communication is intercepted by the server-side intercept module 40 and transformed by a client/server specific data stream. The client/server specific data stream corresponding to the web server originated communication is then sent on the external communication link 35 from the second computer to the first computer. The client/server specific data stream is received by the client-side intercept module 30 and the original HTTP data stream corresponding to the web server originated communication is rebuilt and provided to the web browser 10.

In a particular embodiment of the present invention, the external communication link 35 is a wireless communication link. In such a case, in order to obtain system performance which is acceptable to users, it is desirable to reduce the amount of communication over the external communication link 35 both in the frequency of the communications and in the amount of information which must be transferred over the communication link 35. Accordingly, the present invention preferably utilizes caching, differencing, and protocol reduction techniques to minimize the amount of communication required over the external communication link 35. These techniques are accomplished by converting the stateless or stochastic protocols of HTTP into a client/served specific protocol which utilizes information specific to the client and the server to reduce the amount and frequency of communications.

In operation, the client side intercept 30 and the server side intercept 40 are transparent to both web browsers and web (proxy) servers and, can therefore be employed with any web browser. Both the SSI 40 and CSI 30 cache graphic and HTML objects. If the URL of a browser request specifies an object in the CSI's cache, it is returned immediately as the browser response. The caching functions guarantee cache integrity within a client-specified time interval. The SSI cache is populated by responses from the requested web servers. If a requested URL received from a CSI is cached in the SSI, it is returned as the response to the request.

The present invention preferably utilizes a virtual socket system such as is illustrated in commonly assigned U.S. patent application Ser. No. 08/601,804 entitled CLIENT/SERVER COMMUNICATION SYSTEM, now U.S. Pat. No. 5,754,774 the disclosure of which is incorporated herein by reference as if set forth fully. The present invention also preferably utilizes the data reduction techniques described in commonly assigned U.S. patent application Ser. No. 08/601,753 entitled TIME COHERENT CACHING SYSTEM, now U.S. Pat. No. 5,878,213 and in commonly assigned U.S. patent application Ser. No. 08/601,903 entitled DIFFERENCING COMMUNICATION SYSTEM, the disclosures of which is incorporated herein by reference as if set forth fully, and now becomes U.S. Pat. No. 5,859,971.

While the present invention has and will be described with respect to a single web browser application and a single web server application, as will be appreciated by those of skill in this art, the benefits and advantages of the present invention may also be achieved with multiple web browsers associated with a single web server. Thus, the methods, apparatus and program products of the present invention in connection with multiple browsers each communicating with a client-side intercept module and these client side intercept modules would then communicate with the server-side intercept module of the web server or web proxy.

Furthermore, while the present invention is described herein with respect to both a client-side intercept module and a server-side intercept module, as will be appreciated by those of skill in the art, only a client-side intercept is required by the present invention. Thus, the present invention should not be construed as limited to systems having both a client-side and a server-side intercept module.

The present invention provides for asynchronous request and response processing which permits a user to continue making requests even though previous requests have not completed. Requests are recorded internally for background processing. When requests complete, the results are saved and status is updated a synchronously. The user is (optionally) notified when requests complete and may, at any time, switch to the status page to review the status of one or more requests. The status entry for each request conveys the state of the request (not started, in process, or complete) and contains a link to the response page if the request has completed.

The present invention also provides for disconnected operation when the remote/mobile data processing system is not linked to a computer with access to a server application. Users can operate in either synchronous or asynchronous mode. In either case, when the loss of a connection is detected, or if communication is not possible (e.g., out of signal range), requests may be queued and held for later processing. When communication is re-established, queued requests are automatically processed in the background. This capability enables a user to continue to be productive offline. Furthermore, in many cases, all the pages needed for a transaction may be stored in a local cache and no communication is required. These operations will now be described with respect to FIG. 3 and the flow chart illustrations of FIG. 4 through FIG. 6.

FIG. 3 illustrates a remote/mobile data processing system utilizing a particular embodiment of the present invention. As seen in FIG. 3, a remote/mobile data processing system 5 includes an application such as a web browser 10 executing on the remote/mobile data processing system 5. Requests from the browser 10 are intercepted by an HTTP request interceptor 31 and placed in a request queue 32. The requests in the request queue 32 are processed by a HTTP request queue processor 33 which carries out the requests when a connection is established to a second computer having access to the server specified in the requests. When these requests are processed a service thread 34 is initiated for each request to carry out the request. Responses to the request are placed in the cache 35 and associated with the request from the request queue which generated the request. Such association is illustrated as a dashed line in FIG. 3. The solid line in FIG. 3 from entries in the request queue to the cache represents the association of the request entry with the form used to create the request. Such an association allows for editing of requests by a user even after the requests have been generated. Optionally, both the requests and the responses may be associated with the entries in the queue so that both the request and the response may be provided to a user.

The request queue 32 is a list of requests that have been received from the browser by the HTTP Request Interceptor 31, along with status and control information. Each request element includes all of the information received from the browser (the HTTP headers and any body). This allows the request to be replayed to the network at a later time. Each request element also holds state information associated with the request. This includes a summary of the progress that has been made in processing the request, and a list of remaining work to be done.

Special processing instructions may also be associated with a request in the request queue. For example, in a wireless environment, it is usually too expensive to download graphics embedded in a page. If graphics have been suppressed for this request, this processing control information will be included in the request element. The request queue persists across client sessions.

Internally, a request consists of a set of attributes. Each attribute is a name-value pair. When the request is created, it is given attributes that contain the browser request. As processing proceeds, attributes are added describing the progress, any status information returned from the browser, and so on. Some attributes, such as the progress indication, are per request. Attributes may also be per queue, and in this case control processing for all elements added to the queue. Per-queue attributes are used to support multiple queues that handle requests in different ways, based on their source or the characterisits of the request. Thus, according to the present invention, more than one request queue may be created and requests may be automatically sorted into the appropriate queue when they are received by the client side intercept or they may be manually sorted by user input.

Because the present invention allows for off-line processing using applications such as a browser which were designed for synchronous on-line processing, disconnected and asynchronous operations require new user interfaces. Thus, according to the present invention, if a user's request can be satisfied from the cache, the response is provided immediately and the standard browser interface remains unchanged. On a cache miss, however, the browser's semantics may be extended with mechanisms and interfaces associated with the off-line processing of the present invention.

Because the browser is an immutable piece of code with respect to the present invention, a stand-in page may be returned whenever the remote/mobile data processing system is operating a synchronously or disconnected from the second computer and cannot satisfy a user's request from the cache. This page contains an explanation of what has happened—"Your request has been queued for later processing"— and, if requested, displays the current status of all pending requests. Note that as far as the browser is concerned, this stand-in page is the response to the request. In other words, the browser retains the request/response mechanism, while the intercept module utilizing the present invention handles the details of responding to the request. Furthermore, the same mechanism may be utilized for both disconnected and asynchronous requests in that an informational page is returned to the browser as the response to the request.

Alternatively, an option to return to the current page rather than being presented with an intermediate acknowledgment may be utilized. This option may be implemented by returning code 204 to the browser. From the user's point of view, a link is clicked but the browser remains on the same page, however, the intercept module according to the present invention queues the request in the background.

The present invention will now be described with respect to FIGS. 4 through 6 which are flowchart illustrations of one embodiment of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 4:
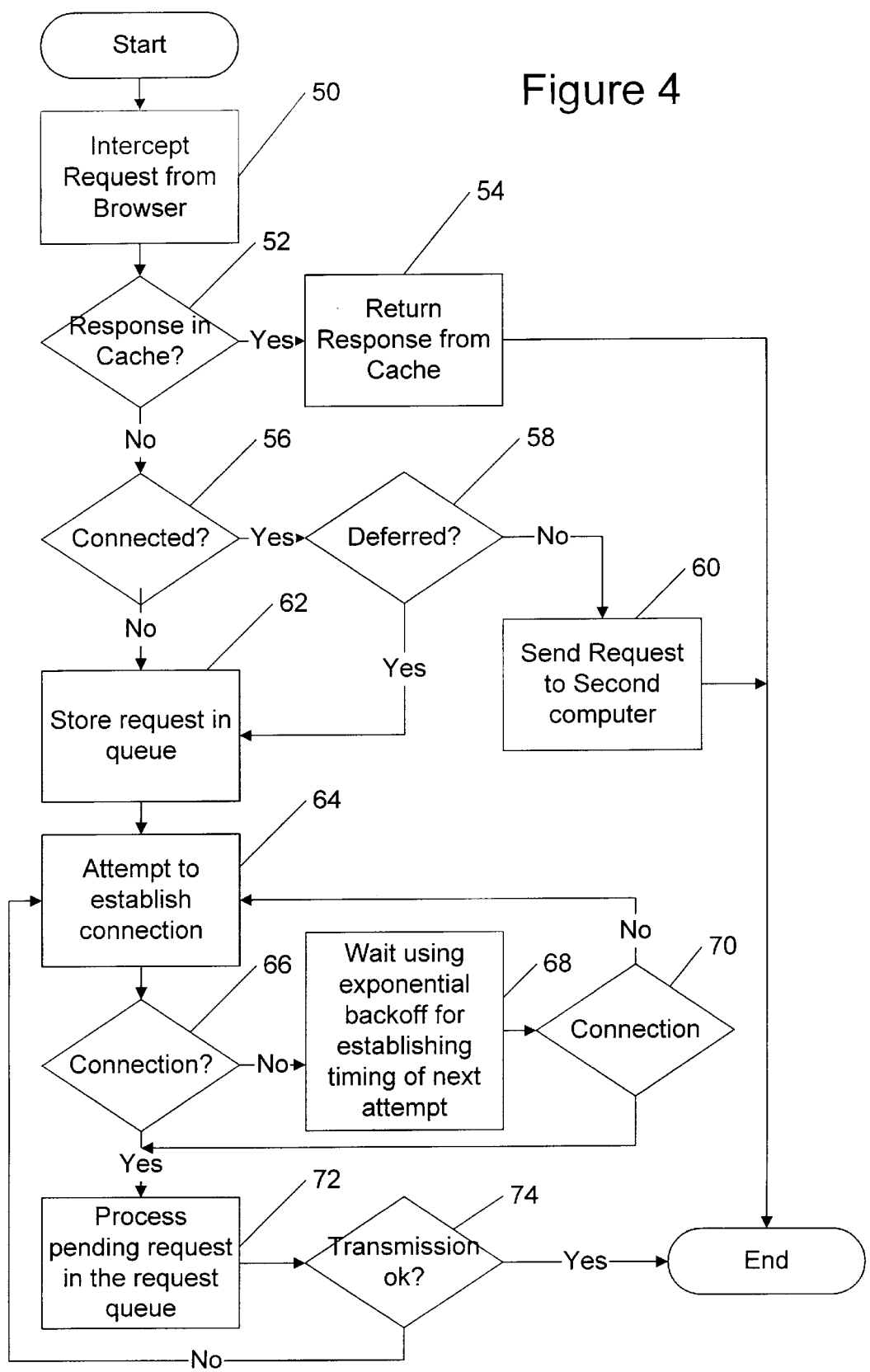
FIG. 4 is a flow chart illustrating disconnected or deferred processing operations according to the present invention.

FIG. 4 illustrates the operation of a client side intercept utilizing the present invention. As seen in FIG. 4, the client side intercept 30 intercepts a request from browser 10 (block 50). The client side intercept then determines if the response to the request is in the cache (block 52) and if it is the cached response is returned to the web browser (block 54).

If the response is not cached, then the client side intercept determines if the data processing system is connected to the second computer for access to the server (block 56). If the data processing system is connected then, if requests are not deferred (block 58), the request is sent to the second computer (block 60). However, if the data processing system is either not connected or request processing is deferred, the the request is stored in a request queue and an interim response is provided to the browser as the response to the request (block 62).

Processing of queued requests is handled by threads that run independently of any other activity in the client side intercept. Requests on the queue are usually handled on a first-in, first-out (FIFO) basis. However, selected requests may be marked as held, all new requests should be held (see block 58). This allows the user to indicate that processing on these requests should be deferred until a later time, even if a connection is available. For example, some requests may be too expensive to handle on a wireless link, and so the user would prefer to defer processing them until a LAN or dialup connection is available. The hold attribute is also applied to any outstanding queued requests remaining when the client is first started. This avoids surprises when switching from an inexpensive link to a potentially much more expensive wireless link.

As is seen in FIG. 4, the first step in handling a queued request is acquiring a connection to the second computer with access to the server of the request (block 64). An attempt is made to get a connection when a request is first received and, if a connection is not established (block 66), attempts will continue until a connection is made, either by the queue processor or due to other activity (block 70 and block 64). An exponential backoff procedure is used to control the delay between connection attempts (block 68). Thus, the time between attempts to connect increase as the number of attempts increases. This backoff procedure provides responsiveness when communication failures are transient without burdening the network when the failures are long term.

Once a connection is established, the information originally saved from the browser and stored in the request queue is used to reconstitute the request and the request is sent to the second computer (block 72). At this point the request appears to a server as if it came directly from the browser. If the request fails due to failures in the wireless link (block 74), subsequent attempts are made at later times. Retrying requests transparently masks transient communications failures. Other types of failures may also be recorded for later return to the user.

Figure 5:
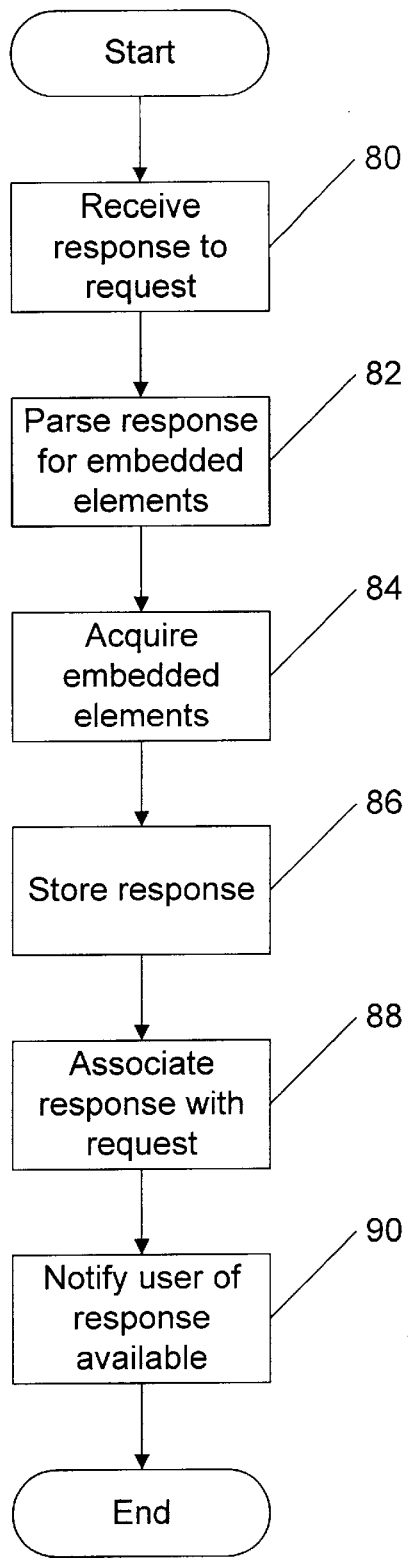
FIG. 5 is a flow chart illustrating operations associated with receiving a response to a browser request at a remote/mobile data process system according to the present invention.

FIG. 5 illustrates the operations of the client side intercept module when a response is received to a previously queued request. As seen in FIG. 5, a response is received from the server (block 80). However, the use of graphics, applets, and other embeds is now nearly universal on Web pages. If the user has asked to see this information, the returned page is parsed for embeds (block 82). Each embed is then retrieved (block 84) and added to the cache along with the original response (block 86). The response is associated with the request and any status information returned with the response is associated with the request (block 88). At this point the request is complete and the user can be notified that it is available (block 90).

Because the present invention provides a transparent HTTP proxy that will work with any browser. Queuing requests for background processing doesn't match the model that browsers expect, thus, an interim response, via HTML or an HTTP code, is returned to the browser so that the browser and the user can continue (see block 62 of FIG. 4). Similarly, HTML pages and embedded HTML information may be used to report status to maintain browser independence.

Status of an outstanding request can be reported in any number of ways, including: an optional completion popup, an optional status bar embedded in the top of returned Web pages, or on an HTML page that summarizes the state of the queue.

The popup let users know that there is a newly completed page to view on the background page, and lists the URL of the page. One of these popups is generated the first time new information becomes available, and then further messages are suppressed until the user has visited the page and viewed the information. This allows the user to get an asynchronous completion notification without being overwhelmed on faster links.

The user may also chose to embed a status bar describing the state of the client side intercept in each returned page. This status bar includes information on the number of requests that have been completed, the number outstanding, and the number held. It also includes a textual version of the popup stating that new results are available, and links to various generated status pages.

One of these links may take the user to a page summarizing the state of the request. The page displays the queue, one line per request. Each request includes a graphical representation of the progress that has been made processing the request, using a visual indicator such as the model of a traffic light, where:

Red: Request has not been sent
Yellow: Base page received and embed(s) pending
Green: Request complete Graphics may also have a distinctive look apart from its color such as red being an open circle, yellow a half-moon, and green a solid ball. In case of error (e.g., the request was sent but the base page could not be retrieved), an X may be placed across the traffic light symbol to indicate failure.

Along with the status graphics, options to delete or hold a request may also be displayed. In the case of forms, the user may also view or re-edit the request. If the request has completed, a link to the cached result may also be included on this page.

In order to provide URL-based access to the background queue and other internally-generated pages, the domain name of the client side intercept may be used (e.g. artour.web.express) coupled with other options as appropriate. For example, the background queue may be accessed accessed via the URL http://artour.web.express/HTEP/. HTTP and a reserved domain name are preferred rather than defining a proprietary protocol name for such requests because standard browsers may reject unfamiliar protocols.

Progress of request handling may also be reported to a user. Requests move through a series of states as they are processed, starting with submitted, to processing begun, to initial page retrieved, and finally to completed. As a request moves into a state, an event describing the transition may be sent to an internal event manager. The internal event manager receives status of requests and forwards status information to other components or applications. Other components may register with the event manager to receive events, filtered by event state and other criteria. Processing events can be used to generate dynamic interfaces the client side intercept. The popup notification is one example of the use of these events.

After a response is received, the response also needs to be saved for future off-line viewing for the user. However, when a browser makes a request and receives a response, it typically handles it in one of two ways. If the response is expected to be relatively static, it is cached by the browser so that future requests to the page can be handled quickly. However, if the page is a response to a forms request, or is otherwise generated (so-called "cgi-bin" requests), the browser only displays the response, and doesn't cache it, since the response is typically different from one cgi-bin request to the next. Also, with objects that the source server marks "no-cache," browsers and proxies, that observe this directive do not save these items. However, when one is retrieved as part of processing a queued request, it must be saved for later viewing.

These, normally transient objects are saved (block 86) as a new category of cached information: user data. These are data that have been retrieved in response to a user request, and only have meaning in the context of that request. Unlike normal web data, user data objects are only accessible as responses on the queue status page. They are not used to handle other requests, since they are transient time- or request-sensitive responses. User data are not subject to the normal coherency and aging algorithms used to manage the cache. They persist and are valid until deleted by the user.

Web page designers often employ HTML forms for data entry that requires only simple interaction. HTML form tags provide a convenient way for building electronic forms for Web interaction. HTML form tags allow a Web user to make selections from a list, to check on/off boxes, to select from radio buttons, to enter text into a text field or a large multi-line text area, and to push action buttons. When the user presses an action button, the entered data is sent to a Web server designated by the action with name/value pairs, where each name represents an input field and each value represents the user's input in the field. In addition, there may be hidden fields, which carry preset values that a Web server sent along with the form. These hidden values are sent back to the server together with the values in visible fields.

Like any HTML page, an HTML form can be cached for future use. According to the present invention, a cached HTML form may be edited for submission later or resubmission again with different user input. For example, a search input form could be edited again and again to send out different search requests. Similarly, an intranet data entry form such as a patient admission form could be edited to correct data entry errors, or resubmitted with new data for a different patient. Most forms can be meaningfully cached for independent future submission because they either have a simple one-form interaction model or contain self-sufficient hidden fields so that the Web application can accept a submission in isolation.

In a mobile environment, disconnected form submission can extend the productivity of users even when a server is not reachable. This allows multiple data entry pages to be filled without connecting to any network. Also, with the re-editing function of the present invention, a user can draft a few forms and have a chance to review, approve, or edit them before they finally are sent to the server.

As described above, a form may be treated as any HTML page and the operations of FIG. 4 carried out to create an entry in the request queue corresponding to the filled out form. Like regular HTML pages, the user obtains a cached HTML form using a URL. The user fills in the form and submits it using one of the action buttons. When a form is submitted, the name/value pairs together with the originating form URL are stored and queued. If the user requests the same URL form again and submits a new result, the new submission is kept separate from the previous submission. Every submission is counted as a separate entry in the queue for automatic submission when a connection becomes available. These entries remains stored until they are deleted by a user.

Figure 6:
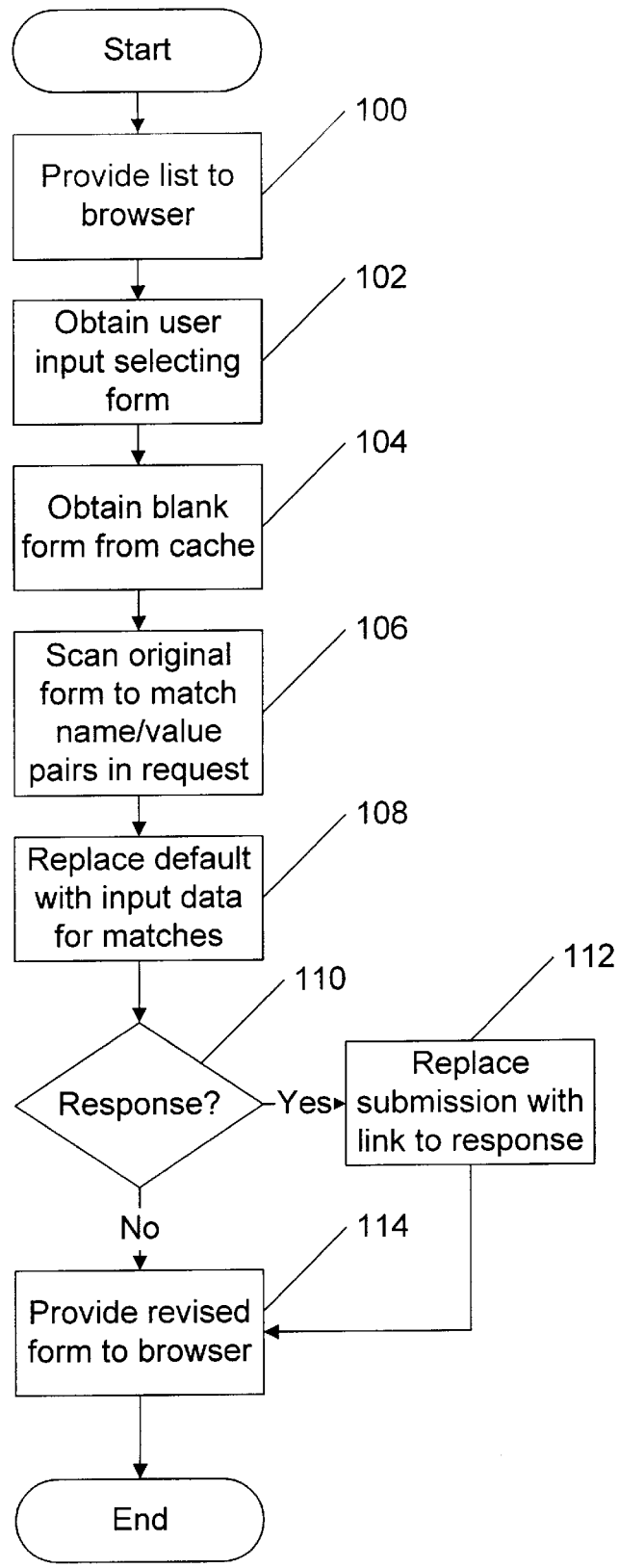
FIG. 6 is a flow chart illustrating operations associated with revising a request according to the present invention.

FIG. 6 illustrates the re-editing process of forms utilizing the present invention. This reediting utilizes the forms in the queue of FIG. 4. As seen in FIG. 6, a list of available forms in the queue is provided to the browser (block 100) and user input selecting a queue entry is obtained (block 102). An HTML page may be presented to the user to display the entries in the queue which may be accessed using hyperlinks.

Based on the user input a form corresponding to the URL of the form used to generate the queued request is obtained from the local cache (block 104). The base form may be retrieved based on previously inserted data indicating the origin of the form. When the blank form is first fetched from the server, the client side intercept inserts hidden values into the HTML before returning the page to the browser. The hidden information includes both the originating URL and the form number within the page. To re-edit the form, the blank form is retrieved using the hidden value containing the form's URL which is stored with the request in the request queue to associate the request with the form that generated the request.

The form and the queued request are scanned to match name/value pairs in the request (block 106). If any match is found, the default selection or input value is then changed to reflect the user's submission (block 108). Special care should be taken with Web pages that consist of multiple HTML forms, since they may use the same field names in different subforms. Therefore, according to the present invention, subforms are assigned a unique identifier and tracked so that the proper form may be recalled to recreate the original request. The original input form and data are then reconstructed. If a response to request has already been received, (block 110) then, optionally, the submission button may be replaced by a link to the response so that the user may view the results of the submission (block 112). Otherwise, the reconstructed request is provided to the browser for editing by the user (block 114). If resubmitted the existing queue entry may be overwritten with the new data, or, optionally, the user could select that a new entry in the queue is provided. Such a feature would allow the user to use a filled out form as a template for creating additional requests with similar data with only minor further input.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method for communicating with a web browser executing on a remote/mobile processing system which is temporarily and intermittently connected to a second computer, said method comprising the steps of:

storing in a persistent request queue at the remote/mobile processing system, a request from the web browser to a server application accessible to the second computer;

providing an interim response to the web browser in response to the request from the web browser; and recalling the stored request to allow user modification of the stored request prior to the request being provided to the second computer for transmission to the server application.

2. A method according to claim 1 further comprising the steps of:

transmitting the stored request to the second computer when the remote/mobile data processing system is connected to the second computer;

receiving, through the second computer, a response to the request from the server;

storing the response to the request at the remote/mobile processing system; and associating the stored response with the stored request.

3. A method according to claim 2, further comprising the step of providing the stored response to the web browser.

4. A method according to claim 2, further comprising the steps of:

providing a list of stored requests to the web browser for presentation to a user;

accepting user input to select one of the stored requests in the list of stored requests; and providing to the web browser, the associated response to a selected one of the list of stored requests based upon user input.

5. A method according to claim 2, further comprising the steps of:

notifying the user of the availability of the received response when the response is received by the remote/mobile data processing system; and providing the response to the web browser if the user requests the response.

6. A method according to claim 1, wherein said step of storing a request from the web browser comprises the steps of:

storing an HTML form associated with the request;

storing user input associated with the request; and associating the stored user input with the stored HTML form.

7. A method according to claim 6, further comprising the steps of:

providing a list of stored requests to the web browser for presentation to a user;

accepting user input to select one of the stored requests in the list of stored requests; and wherein said recalling step recalls the stored request selected by the user input.

8. A method according to claim 7, wherein said step of recalling the stored request comprises the steps of:

recalling the stored form associated with the request;

recalling the stored user input associated with the request; and providing the recalled form and the recalled user input to the web browser so as to recreate the form with the user input.

9. A method according to claim 8, wherein said step of providing the recalled form and the recalled user input comprises the steps of:

scanning the recalled form for named fields in the recalled form;

scanning the recalled user input for name/value pairs in the user input; and replacing the default selection or user input of the named field in the recalled form with the value of a matching name/value pair from the user input.

10. A method according to claim 8, further comprising the steps of:

determining if a response to the recalled stored request has been stored at the remote/mobile data processing system; and adding a link to the stored response to the recalled form so as to provide to the user a hyperlink to recall the stored response.

11. A method according to claim 8, further comprising the steps of:

accepting user input to revise an original request from the web browser so as to provide a revised request based upon the original request modified by the user input; and storing the revised request in the request queue.

12. A method according to claim 11, wherein said step of storing the revised request comprises the step of replacing the request in the request queue with the revised request.

13. A method according to claim 1, further comprising the steps of:

determining if said remote/mobile data processing system is linked to the second computer; and wherein said storing and said providing steps are carried out if said determining step determines that the remote/mobile data processing system is not linked to the second computer.

14. A system for communicating with a web browser executing on a remote/mobile processing system which is temporarily and intermittently connected to a second computer, comprising:

means for storing in a persistent request queue at the remote/mobile processing system, a request from the web browser to a server application accessible to the second computer;

means for providing an interim response to the web browser in response to the request from the web browser; and means for recalling the stored request to allow user modification of the stored request prior to the request being provided to the second computer for transmission to the server application.

15. A system according to claim 14 further comprising:

means for transmitting the stored request to the second computer when the remote/mobile data processing system is connected to the second computer;

means for receiving, through the second computer, a response to the request from the server;

means for storing the response to the request at the remote/mobile processing system; and means for associating the stored response with the stored request.

16. A system according to claim 15, further comprising means for providing the stored response to the web browser.

17. A system according to claim 15, further comprising:
means for providing a list of stored requests to the web browser for presentation to a user;
means for accepting user input to select one of the stored requests in the list of stored requests; and
means for providing to the web browser, the associated response to a selected one of the list of stored requests based upon user input.

18. A system according to claim 15, further comprising:
means for notifying the user of the availability of the received response when the response is received by the remote/mobile data processing system; and
means for providing the response to the web browser if the user requests the response.

19. A system according to claim 14, wherein said means for storing a request from the web browser comprises:
means for storing an HTML form associated with the request;
means for storing user input associated with the request; and
means for associating the stored user input with the stored HTML form.

20. A system according to claim 19, further comprising:
means for providing a list of stored requests to the web browser for presentation to a user;
means for accepting user input to select one of the stored requests in the list of stored requests; and
wherein said means for recalling recalls the stored request selected by the user input.

21. A system according to claim 20, wherein said means for recalling the stored request comprises:
means for recalling the stored form associated with the request;
means for recalling the stored user input associated with the request; and
means for providing the recalled form and the recalled user input to the web browser so as to recreate the form with the user input.

22. A system according to claim 21, wherein said means for providing the recalled form and the recalled user input comprises:
means for scanning the recalled form for named fields in the recalled form;
means for scanning the recalled user input for name/value pairs in the user input; and
means for replacing the default selection or user input of the named field in the recalled form with the value of a matching name/value pair from the user input.

23. A system according to claim 21, further comprising:
means for determining if a response to the recalled stored request has been stored at the remote/mobile data processing system; and
means for adding a link to the stored response to the recalled form so as to provide to the user a hyperlink to recall the stored response.

24. A system according to claim 21, further comprising:
means for accepting user input to revise an original request from the web browser so as to provide a revised request based upon the original request modified by the user input; and means for storing the revised request in the request queue.

25. A system according to claim 24, wherein said means for storing the revised request comprises means for replacing the request in the request queue with the revised request.

26. A system according to claim 14, further comprising:
means for determining if said remote/mobile data processing system is linked to the second computer; and
wherein said means for storing and said means for providing are store and provide requests if said means for determining determines that the remote/mobile data processing system is not linked to the second computer.

27. A computer program product for communicating with a web browser executing on a remote/mobile processing system which is temporarily and intermittently connected to a second computer, the computer program product comprising:
a computer-readable storage medium having computer-readable program code means embodied in said medium, said computer-readable program code means a comprising:
computer-readable program code means for storing in a persistent request queue at the remote/mobile processing system, a request from the web browser to a server application accessible to the second computer;
computer-readable program code means for providing an interim response to the web browser in response to the request from the web browser; and
computer-readable program code means for recalling the stored request to allow user modification of the stored request prior to the request being provided to the second computer for transmission to the server application.

28. A computer program product according to claim 27 further comprising:
computer-readable program code means for transmitting the stored request to the second computer when the remote/mobile data processing system is connected to the second computer;
computer-readable program code means for receiving, through the second computer, a response to the request from the server;
computer-readable program code means for storing the response to the request at the remote/mobile processing system; and
computer-readable program code means for associating the stored response with the stored request.

29. A computer program product according to claim 28, further comprising computer-readable program code means for providing the stored response to the client application.

30. A computer program product according to claim 28, further comprising:
computer-readable program code means for providing a list of stored requests to the web browser for presentation to a user;
computer-readable program code means for accepting user input to select one of the stored requests in the list of stored requests; and
computer-readable program code means for providing to the web browser, the associated response to a selected one of the list of stored requests based upon user input.

31. A computer program product according to claim 28, further comprising:
computer-readable program code means for notifying the user of the availability of the received response when the response is received by the remote/mobile data processing system; and computer-readable program code means for providing the response to the web browser if the user requests the response.

32. A computer program product according to claim 27, wherein said computer-readable program code means for storing a request from the web browser comprises:

computer-readable program code means for storing an HTML form associated with the request;

computer-readable program code means for storing user input associated with the request; and computer-readable program code means for associating the stored user input with the stored HTML form.

33. A computer program product according to claim 32, further comprising:

computer-readable program code means for providing a list of stored requests to the web browser for presentation to a user;

computer-readable program code means for accepting user input to select one of the stored requests in the list of stored requests; and wherein said computer-readable program code means for recalling recalls the stored request selected by the user input.

34. A computer program product according to claim 33, wherein said computer-readable program code means for recalling the stored request comprises:

computer-readable program code means for recalling the stored form associated with the request;

computer-readable program code means for recalling the stored user input associated with the request; and computer-readable program code means for providing the recalled form and the recalled user input to the web browser so as to recreate the form with the user input.

35. A computer program product according to claim 34, wherein said computer-readable program code means for providing the recalled form and the recalled user input comprises:

computer-readable program code means for scanning the recalled form for named fields in the recalled form;

computer-readable program code means for scanning the recalled user input for name/value pairs in the user input; and computer-readable program code means for replacing the default selection or user input of the named field in the recalled form with the value of a matching name/value pair from the user input.

36. A computer program product according to claim 34, further comprising:

computer-readable program code means for determining if a response to the recalled stored request has been stored at the remote/mobile data processing system; and computer-readable program code means for adding a link to the stored response to the recalled form so as to provide to the user a hyperlink to recall the stored response.

37. A computer program product according to claim 34, further comprising:

computer-readable program code means for accepting user input to revise an original request from the web browser so as to provide a revised request based upon the original request modified by the user input; and computer-readable program code means for storing the revised request in the request queue.

38. A computer program product according to claim 37, wherein said computer-readable program code means for storing the revised request comprises computer-readable program code means for replacing the request in the request queue with the revised request.

39. A computer program product according to claim 27, further comprising:

computer-readable program code means for determining if said remote/mobile data processing system is linked to the second computer; and wherein said computer-readable program code means for storing and said computer-readable program code means for providing are store and provide requests if said computer-readable program code means for determining determines that the remote/mobile data processing system is not linked to the second computer.

* * * * *